Aug. 16, 1966  A. B. STILES  3,266,477

SELF-CLEANING COOKING APPARATUS

Filed April 15, 1964

INVENTOR
ALVIN B. STILES

BY *Albert B. Griggs*
ATTORNEY

United States Patent Office 3,266,477
Patented August 16, 1966

3,266,477
SELF-CLEANING COOKING APPARATUS
Alvin B. Stiles, Wilmington, Del., assignor to E. I. du Pont de Nemours and Company, Wilmington, Del., a corporation of Delaware
Filed Apr. 15, 1964, Ser. No. 359,984
4 Claims. (Cl. 126—19)

This invention relates to cooking devices and is more particularly directed to cooking devices which are made self-cleaning by providing a catalytic oxidizing surface upon those areas which are exposed to products resulting from heating food so that by heating the oven after use any food residues can be oxidized and thus removed.

The difficulties experienced in cleaning cooking devices has recently led to the development of a self-cleaning oven. This operates by heating the oven to burn out food residues. This is not as satisfactory as could be desired because of the high temperatures required to effect the cleaning, say 800 to 900° F.

According to the present invention the temperatures required for cleaning cooking devices can be dramatically lowered by providing on exposed surfaces a catalytic coating which will oxidize the food residues on the surfaces. Thus at moderate temperatures of, say 400 to 500° F., cooking devices can be cleaned without overheating a kitchen or work area and without many other attendant difficulties of high temperatures such as distortion of the equipment, requirements for large amounts of insulation, and the like.

The invention may be better understood by reference to the drawings.

Figure 5:
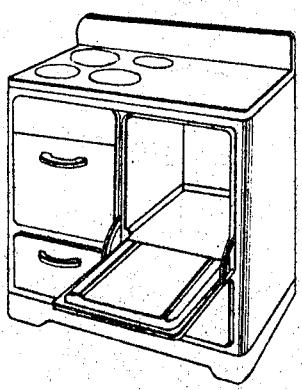
FIGURE 5 illustrates a conventional household stove as an illustrative cooking device to which the present invention is applicable.

The present invention is applicable to a great variety of cooking devices. Thus it can be applied to ovens and grills used industrially or for household purposes. In each instance the surfaces of such devices and appliances which are splattered by grease or receive drippings of grease or food particles can be coated with a catalyst according to the invention. In the same way the trays and grills of broilers as well as their side walls can be treated. Trays and reflectors below burners and cooking appliances can similarly be treated. The shelves and grids of cooking devices can also be treated with catalysts according to the invention. A typical household stove is illustrated in FIGURE 5.

It will be understood that the invention is very broadly applicable to those surfaces of cooking devices which are subject to receiving splattered grease and other food products of cooking and will include brick ovens, ceramic ovens and of course the customary metal ovens in household use. This can extend similarly to cooking devices in which heating elements are embedded in ceramic walls or trays. The invention of course can be applied to such devices as rotisseries, chafing dishes, grills and broilers of all sorts.

According to the present invention the exposed surfaces of cooking devices as described are so treated as to present catalytically oxidizing surfaces which are effective at temperatures as low as 400 to 500° F. They are of course effective at higher temperatures but it is not usually desirable to use any higher temperature than is required. There are catalysts which are effective as low as 350° F. or even somewhat below and these can be used but considerably longer times are required than for the more preferred catalysts of the invention.

Catalytic oxidizing agents effective at above 350° F. and especially above 400 to 500° F. are well-known and no extended description of them is required because those skilled in the art are thoroughly familiar with them.

Such catalysts are inorganic compounds known in the art for the complete oxidation of hydrocarbons, oils, greases, esters, organic acids, aldehydes and ketones.

According to the present invention a catalyst is supported upon a cooking surface as above described in any of a variety of ways. For purposes of the invention it is only important that a catalyst as described be exposed upon the cooking surfaces which receive food products. This is illustrated in the drawings with respect to certain specific embodiments.

Figure 1:
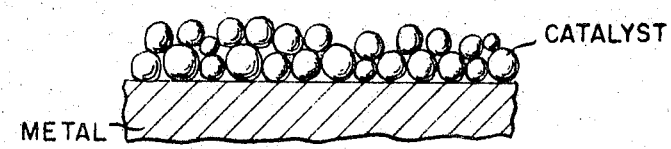
FIGURE 1 is an artist's illustration, partly in cross-section, of an oven interior wall coated with an adherent catalyst carrier which supports an oxidizing catalyst.

In FIGURE 1 there is illustrated a metal cooking surface as of a stove or another of the cooking devices as above described which is coated with a catalyst. The catalyst can be chromium oxide, cerium oxide, manganese oxide, or another of the catalysts hereinafter described which can be applied as by means of a plasma jet. This is a familiar device which passes the oxides through an ionized flame so that they will adhere strongly to the metal surface. The coatings of FIGURE 1 will be further described in the examples as will the devices of the remaining figures.

Figure 2:
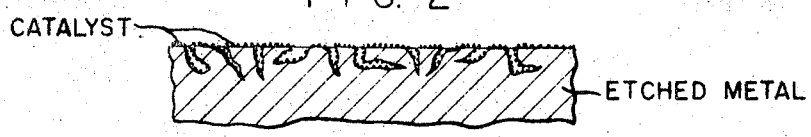
FIGURE 2 is a similar illustration of a cooking surface which has been etched and then treated with a catalyst according to the invention.

In FIGURE 2 there is illustrated a modification in which the metal surface of the cooking device can be etched as with a suitable acid. Depending upon the etching agent used the catalytic metals, nickel, copper, chrome or several of them can be left. If the surfaces of cooking devices are of steel or aluminum or even of stainless steel or other such metals they can, after etching, be coated with a catalyst as shown. For example, such catalysts as cerium oxide, platinum black, palladium, ruthenium, or any of the other catalysts hereinafter described, can be used either as particulate catalytic materials or they can be applied on a suitable particulate substrate such as alumina particles. It will of course be understood that the surfaces of the cooking devices can be of any of a wide variety of alloys or of composite structures such as steel walls which are aluminum clad, the aluminum having been etched.

Figure 3:
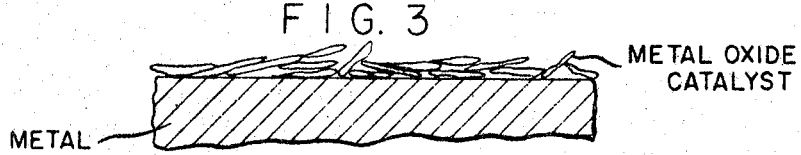
FIGURE 3 is a similar illustration of a cooking surface coated with a metal oxide, the oxide itself serving as a catalyst.

FIGURE 3 illustrates a modification in which an oxide coating is present upon the surfaces of a cooking device. The substrate metal can be iron, stainless steel, nickel-chrome alloys, copper, galvanized iron, and similar composite structures. According to this modification an oxide is formed by treatment with a suitable oxidizing agent, hydrogen peroxide or sodium peroxide. Other strong oxidizing agents can be used such as nitric acid, permanganic acid, as will hereinafter be described.

Figure 4:
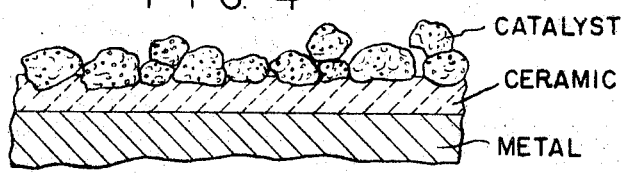
FIGURE 4 is a similar illustration of a still further modification in which a cooking surface carries a ceramic coating in which is partially embedded a catalyst carrier which in turn supports a catalyst.

FIGURE 4 is still another modification which shows a preferred embodiment of the invention. In this embodiment a surface of a cooking device which is shown as of metal is coated with a material which is resistant to temperature but which can soften somewhat upon heating. This can be a ceramic as illustrated. The ceramic or similar material is coated with a particulate catalyst which can be upon a support or not and the catalyst is partially embedded in the ceramic as by heating the ceramic to the softening point with the catalyst in contact with it. It is of course obvious that the catalyst should not be so deeply embedded as greatly to obstruct access to the catalytic surfaces and yet should be deeply enough embedded to hold the catalyst securely upon the cooking surfaces.

Referring more particularly to the metal walls and other surfaces of cooking appliances as illustrated in FIGURES 1 through 4, the metal there illustrated can be any suitable materials of construction. Thus the walls can be of iron and steel and any of the various alloys of these including stainless steel with various ratios of iron, chromium, and nickel. The metal can be chromium nickel alloys, aluminum or alloys of aluminum, or copper and its various alloys. The walls can be, as suggested above, composite structures of two or more layers such as galvanized iron or copper or aluminum clad iron or stainless steel. There can of course be used iron, steel or other metals electroplated with coatings of copper, chromium or other metals.

As briefly mentioned above and as will be described further in the examples the metal selected particularly for embodiments of FIGURES 2 and 3 should be amenable to chemical reaction. In FIGURE 2 the metal should be subject to etching to provide a substrate for a catalyst or in a preferred embodiment to provide a catalyst by the etching process. In FIGURE 3 the metal should by the reaction produce a catalytic coating of oxide or another compound of the substrate.

The catalysts to be used on surfaces of cooking devices according to the invention can be any of those previously described but more generally there can be used any catalyst effective above 350° F. or better yet above somewhere between 400 and 500° F. Of course such catalysts, as is well recognized, have increased oxidizing potential as temperature goes above the threshold temperature at which they begin to be effective.

The catalytic materials are any of the well-known catalysts for oxidation as previously described such as the catalytically active compounds of copper, tin, vanadium, niobium, bismuth, chromium, molybdenum, tungsten, manganese, rhenium, iron, cobalt, nickel and cerium. Compounds of the precious metals or the metals themselves can be used in accordance with known practices. The precious metals particularly suitable are ruthenium, rhodium, palladium, and platinum. As is customary, the various catalytic metals will be used as their oxides, cerates, manganates or manganites, chromates or chromites, or their vanadates.

Especially preferred catalysts because of their comparatively high activity at low temperatures are ruthenium, palladium, and platinum metals and the oxides, cerates, manganates or manganites, chromates or chromites or vanadates of cobalt, nickel, cerium, ruthenium, palladium and platinum.

It is to be observed that some of the metals shown are comparatively less effective oxidizing agents under most conditions and it is ordinarily desirable that they be used upon such a catalyst support as will enhance their activity. Thus iron oxide, copper oxide, iron molybdate, are preferably thus supported. It will be observed hereinafter that the supports can often be the etched metal base and can be formed in situ in various ways.

It is to be observed that under some circumstances compounds of certain of the catalytic metals such as copper and chromium are possibly somewhat toxic. This is however well understood and these metals and others are frequently used in cooking utensils and devices without harmful effects.

Reference has been made above to catalyst supports and for highest activity it is ordinarily desirable to use an appropriate material as a support.

According to the embodiment of the invention of FIGURE 2 a catalyst support can be the surface of an etched metal which constitutes a surface of a cooking device. Thus stainless steel can be etched with a fused salt of sodium carbonate, sodium hydroxide, potassium carbonate, or potassium hydroxide. This removes a portion of the chromium and leaves residual iron or nickel and iron which are somewhat catalytic. Preferably the etched surfaces are further treated with a catalyst.

To apply catalytic material, cerium nitrate, for example, can be added as a solution, dried and calcined to form cerium oxide. In the same way and in manners already conventional in the art other catalysts can be formed in situ on the etched surface.

A supported catalyst can also be formed in situ as for example in the case of stainless steel the cerium of the cerium oxide can react with nickel which may be exposed to form a nickel cerate. This can in turn be used as a substrate for platinum black or of course can be used as a catalyst without the platinum. The various materials of construction of cooking devices as described above can similarly be etched with appropriate acids or alkalis to remove one or more metals and to effect a surface etching. This will be illustrated in the examples hereinafter.

As illustrated in FIGURE 3, various of the materials of construction can be oxidized to form appropriate substrates to receive catalysts and of course with some materials of construction the oxides will themselves have catalytic properties. In preferred embodiments such catalytic properties are inadequate and the surfaces must be further treated. An aluminum or aluminum clad surface can be oxidized as with sodium peroxide or by electrolytic oxidation or in any other suitable fashion to form an alumina which is ordinarily somewhat porous and serves as a carrier for the catalysts previously described. The aluminum, and of course other metals, can be etched or embossed or mechanically roughened before such oxidation if desired. Of course irons and stainless steels can be oxidized, the latter with some difficulty, to afford carriers for catalysts as described. Zinc and copper surfaces as on electroplate and galvanized sheet can be oxidized to give surfaces suitable for carrying catalysts.

The various catalysts as described can be supported upon particulate carriers in accordance with conventional practices. These carriers in turn apply to cooking surfaces. Such carriers include finely divided alumina, ceria, silica-alumina, magnesia, calcium oxide, silica, zirconia, titania, calcium sulfate, berium oxide, chromia, manganese oxide, chromites, maganites and numerous of the catalytic materials already mentioned which in addition because of their high surface area and porous and refractory nature are especially useful as carriers for other catalysts.

One of the preferred carriers is gamma alumina or another active form of alumina customarily used as a catalytic support. Preferably this should be of a particle size passing a U.S. standard 100-mesh screen. The surface area should not exceed 5 square meters per gram.

The aluminas used are those designated as active or activated in the art and are used as catalyst carriers. They usually include one or a combination of forms called gamma, eta, chi, and of course kappa alumina. Sometimes for purposes of economy the natural ore, bauxite, or diaspore is used.

A preferred support material which can be used as a particulate substance, as a coating upon a metal surface of a cooking device, or which can be used as the material of construction of one or more surfaces of a cooking device is an alumina in a particular form and composition. The alumina is in the form of a porous refractory body comprising a skeletal structure of dense crystalline cell-defining walls having a thickness between 0.3 and 200 mils and containing at least 30% by weight of alumina, the wall material being selected from the group consisting of alpha alumina, compounds and solid solutions of alumina, and at least one other oxide and solid solutions of at least one oxide in said compounds of alumina. Such products are described in Belgian Patent 612,535.

The product just described can be applied as a grout and thereafter fired. The product can of course be applied in any of the manners suggested in the Belgian patent.

The alumina structures just described can be coated with a catalyst as above mentioned. Catalysts applied to the interior surfaces of cooking devices as described can be prepared using such alumina appropriately treated and constituted as described in further detail in United States patent applications of Talsma, Serial Nos. 222,238, filed September 7, 1962 and 293,618, filed July 9, 1963. It is not thought necessary here to give in detail all of the information in the applications just cited and the description of mode of applying catalysts is herewith incorporated by reference.

In a preferred embodiment of the invention as shown in FIGURE 4 the catalyst which should itself be a porous material or else supported upon a porous material is partially embedded in a ceramic or glass frit. The ceramic can be any of those used for the coating of the walls of cooking appliances. Coating can be carried out by applying the catalyst in the form of a finely divided powder to the frit either in a heated and somewhat soft plastic condition or can be applied and thereafter heated. The frit and temperature of heating should be so related that the catalyst will become partly embedded but it should not be heated to such a temperature that the ceramic frit or glass frit becomes fluid enough to fill any great proportion of the pores of the catalyst carrier. Inactivity could otherwise result.

The amount of catalyst supported upon a carrier or unsupported can vary widely. Ordinarily a very thin coating will be sufficient and the coating need not even be entirely continuous. Large amounts can be used so that the coating is moderately thick but this is wasteful of catalyst.

The mode of use of cooking devices according to the present invention is believed obvious. After there is a certain accumulation of drippings and splatterings of food products in cooking devices the walls of which are coated with catalyst according to the invention, these accumulations are removed by heating the cooking device to a temperature of 350° F. or preferably from 400 to 500° F. or somewhat above. There is of course air present in such cooking devices and there is a catalytic reaction which will convert the food products to carbon dioxide and water.

The catalyst and support may become incompletely revived catalytically and incompletely reverted to its original color so that the oven becomes discolored. To avoid this condition and to cure it a solution of a strong oxidizing agent such as hydrogen peroxide can be applied in solution to the surfaces of the cooking device and surfaces thereafter can be heated to return them to their original color and condition.

In order that the invention may be better understood reference should be had to the following illustrative examples.

*Example 1*

A kitchen oven is made of mild steel with its internal walls coated as shown in FIGURE 1 with a coating about 10 mils thick of cerium oxide. The cerium oxide coating is applied by passing cerium oxide through a plasma jet and directing the heated stream upon the metal surfaces to form a thin adherent coating.

After the oven is used for cooking meats, the food drippings and splatterings can be cleaned from the oven by heating it to about 500° F. for four hours. At 550° F. about two hours is required to clean the oven. At higher temperatures still shorter times are sufficient.

Similar results are obtained using a similar coating of chromium oxide, nickel chromite, manganese chromite, cobalt chromite and manganese applied via plasma jet in the same manner.

*Example 2*

(1) An 18" x 20" sheet of 1/16" 304 stainless steel representing one wall of an oven for a domestic stove is immersed for 30 minutes in a fused salt of sodium hydroxide at 400° C.

(2) The sheet is removed from the fused salt and is washed thoroughly to remove the alkali.

(3) The sheet is dried by placing in an oven at 125° C. for 30 minutes. This etched surface, which is depicted in FIGURE 2 of the drawings as an etched and pitted effect, represents an active catalyst for the low temperature oxidation and removal of organic stains and splashes from cooking performed in the oven.

There is added to the etched sheet, after the drying operation, a solution of 10% cerium nitrate in distilled water. This is calcined at 300° C. and produces a surface, also depicted in FIGURE 2 with added catalytic materials as dots on the etched and pitted surface, similarly useful to that produced in paragraph (3) above.

In addition to the cerium oxide added in the previous paragraph, there is added also a 0.01% solution of a mixture of ruthenium and platinum chlorides in equal weight proportion. The sheet is then calcined at 400° C. for 3 minutes and is thereafter immersed in a 30% formaldehyde solution, and is finally dried at 150° C. This sheet also is used as one of the walls of a self-cleaning oven and serves well in this capacity.

Instead of the 0.01% platinum-ruthenium solution described above, a 1% solution of platinum and rhodium chlorides in equal weight concentrations is similarly used, similarly calcined and similarly reduced with formaldehyde. This panel also is useful in the self-cleaning oven service.

Instead of the platinum and rhodium salts specified in the foregoing paragraph, there is used a 10% solution of ammoniacal nickel chromate (made by mixing 98.4 parts by weight nickel nitrate hexyhydrate, 200 parts by weight of 28% ammonium hydroxide with 318 parts by weight of distilled water to produce a solution, mixing this solution with a second solution comprising 33 parts by weight of chromic acid anhydride, 150 parts by weight of 28% ammonium hydroxide solution and 467 parts by weight of distilled water); this panel is dried and finally calcined at 400° C., but is not given the formaldehyde treatment.

Instead of ammoniacal nickel chromate, there is used in a series a 10% concentration of each of the following: ammoniacal cobalt chromate, ammoniacal copper chromate (prepared as for the ammoniacal nickel chromate), or ammonium tungstate or ammonium molybdate or ammonium vanadate. In each of these cases, each panel is subsequently calcined at 400° C., but is not reduced by the formaldehyde treatment.

*Example 3*

(1) An aluminum sheet 18" wide x 20" long x 1/16" thick is immersed for 30 minutes in a 50% solution of nitric acid at 40° C.

(2) The panel is removed from the nitric acid and is thoroughly washed to remove residual acid.

(3) The sheet is dried and is finally heat treated at 200° C. for 30 minutes.

(4) The aluminum oxide surface so developed becomes the base for catalysts by impregnating this surface through the immersion technique in which the etched sheet is immersed for 1 minute in a 0.1% solution of platinum and ruthenium chloride salts in equal weight proportions of platinum and ruthenium.

(5) The impregnated sheet obtained in paragraph (4) is calcined at 400° C. and thereafter is immersed in a 30% solution of formaldehyde. It is thereafter dried and is useful as a wall for a self-cleaning oven.

There can be used instead of the concentration and composition of precious metals salts above described a 1% solution of platnium and rhodium in equal weight proportions as the chlorides.

There can instead of the impregnation with the precious metals be an impregnation with a 10% solution of aluminum nitrate followed by calcining and subsequent impregnation with nickel nitrate and cerium nitrate in 5% weight proportions, each in aqueous solution followed by calcining at 400° C. No formaldehyde treatment is necessary in this type catalytic surface.

*Example 4*

(1) A black sheet iron panel 18" wide x 20" long is coated with enamel of a type described by A. I. Andrews in his book "The Preparation, Application, and Properties of Vitreous Enamels," Twin City Printing Co., Champaign, Ill., 1935. The enamel selected is one softening at 1600° F.

(2) The enameled sheet is immersed for a period of 5 minutes in a 15% aqueous solution of hydrochloric acid at 50° C.

(3) After this period of exposure to the hydrochloric solution, the etched enamel is thoroughly washed to remove acid and salts.

(4) The etched panel is dried.

(5) The panel is immersed in a solution comprising 1% total weight of equal weight proportions of platinum and ruthenium chlorides. The panel is dried at 400° C. for 2 minutes. The heat treated panel is immersed for 1 minute in a 30% solution of formaldehyde. The panel is thereafter dried at 150° C. for 15 minutes. The panel so prepared is useful as a wall in self-cleaning ovens.

Instead of the platinum-ruthenium salts there can instead be used platinum-rhodium salts in identical concentrations and weight ratios.

Instead of the platinum-ruthenium specified above, there can instead be a prior coating of the etched surface by immersion in a 10% solution of cerium nitrate and aluminum nitrate in equal weight proportions followed by calcining at 400° C., and this then followed by impregnation by immersion in a 10% solution of nickel nitrate which thereafter is calcined at 400° C. No formaldehyde treatment of this type material is necessary to develop the active self-cleaning oven surfaces.

*Example 5*

(1) An 18" x 20" panel, 1/16" thick, composed of copperclad mild steel is oxidized in an air atmosphere at 500° C.

(2) This produces a surface of copper oxide resembling that depicted in FIGURE 3 of the accompanying drawings. The oxide surface so developed is useful as presented for a surface in self-cleaning ovens.

Instead of using the oxide surface as developed, it is further treated by immersing the sheet in an aqueous solution of 10% cerium nitrate. The sheet is calcined at 400° C., then is again immersed in a solution of ammoniacal copper chromate of Example 2 and is thereafter calcined at 400° C.

Instead of the solution of ammoniacal copper chromate, there is used an ammoniacal solution of cobalt chromate and in another embodiment nickel chromate with the ensuing instructions being the same.

Instead of the ammoniacal copper chromate, there is used a 10% solution of ammonium molybdate, ammonium metavanadate, or a slurry of finely pulverized ammonium tungstate.

*Example 6*

(1) An aluminum panel, 18" x 20" and 1/16" thick, is given an oxidative, anodized treatment to develop a thin layer of aluminum oxide on its surface. This technique is well known in the art, and does not require a special description of the procedure. The anodized aluminum surface is impregnated by immersion in a solution containing 5% cerium nitrate and 5% nickel nitrate.

(2) The wet panel is dried, calcined at 400° C. and thereafter is used as one of the panels in a self-cleaning oven.

Instead of the nickel nitrate, there is used a similar quantity of manganese nitrate. In other preparations, there is used copper nitrate, cobalt nitrate or iron nitrate in similar proportions.

Instead of the cerium-nickel nitrate solution, there is used a 2% solution of ruthenium and platinum chlorides in equal weight quantities. The panel is thereafter dried and calcined at 400° C. and is reduced by the formaldehyde treatment.

*Example 7*

(1) A nickel-clad sheet iron surface 20" x 18" x 1/16" is oxidized by heat treatment at 600° C. in air for 24 hours.

(2) This panel is next immersed in a 10% solution of aluminum nitrate, then is baked at 400° C. for 30 minutes.

(3) This surface is then useful for panels in self-cleaning ovens.

The panel on which had been developed the nickel oxide-aluminum oxide surface is immersed in a solution comprising 1% total salt of platinum and rhodium chlorides in equal weight quantities, then is calcined at 400° C. for 3 minutes. Thereafter, the panel is immersed in a 30% formaldehyde solution and is dried at 150° C.

*Example 8*

(1) An 18" x 20" galvanized sheet iron panel, 1/32" thick, is oxidized by exposure to air at 350° C. for 30 minutes.

(2) This panel is immersed in a solution comprising 5% cerium nitrate and 5% manganese nitrate for 1 minute.

(3) The panel is then calcined at 400° C. for 3 minutes. It is then useful as a panel in self-cleaning ovens.

*Example 9*

(1) A 20" x 20" x 1/16" thick sheet of nickel chrome alloy stainless steel is uniformly dusted with powdered sodium peroxide.

(2) The sheet is heated at 300° C. for 30 minutes.

(3) The sheet is then thoroughly washed with distilled water to remove the water-soluble reaction products of the alloy and the sodium peroxide. The sheet, after drying, is suitable for use as one of the panels of a self-cleaning, domestic cooking oven.

Further catalytic treatment of the panel is also accomplished by impregnating the sheet with a solution containing 5% cerium nitrate and 5% nickel nitrate. This is calcined at 400° C. and is then suitable for use as a panel in domestic, self-cleaning ovens.

The same procedure is used as when the cerium and nickel nitrates are used except instead of the cerium nitrate, a salt designated "mixed nitrates" of the rare earth elements is used together with manganese nitrate, each one being present in 5% proportion. This also is suitable for a panel use.

Instead of the nickel nitrate, there is substituted in other tests a like quantity of manganese nitrate or cobalt nitrate, or iron nitrate, or ammonium molybdate, or ammonium tungstate, or ammonium metavanadate in like quantity.

Instead of the aforementioned salts, there can be used 1% of either platinum chloride, palladium chloride, ruthenium chloride or rhodium chloride together with the mixed rare earth nitrates. The rare earth nitrates are an article of commerce and are mixtures of cerium and the other rare earth elements in small proportions.

*Example 10*

(1) Referring to FIGURE 4, a 20" x 20" x 1/16" sheet iron panel is coated with a high temperature glass melting in the range of 1600° C. The composition is selected from the aforementioned A. I. Andrews textbook on enameling.

(2) The enameled surface is painted with a thin coating of printing oil such as that designated as No. 134 available from B. F. Drakenfeld & Co., 45 Park Place, New York, N.Y.

(3) The tacky printing oil is thinly but uniformly dusted with gamma-aluminum oxide as the so-called "activated aluminum oxide" in a mesh size finer than 100 mesh.

(4) The panel with adhering aluminum oxide is then fired at 1600° F. for 3 minutes. During this exposure, the printing ink is oxidized, the enamel becomes tacky, and the alumina becomes partly embedded in the enamel.

(5) After cooling, the alumina protruding from the surface of the enamel is impregnated with a 10% solution of nickel nitrate.

(6) The panel is next calcined at 400° C. for 5 minutes and is thereafter useful as a wall of a self-cleaning, domestic cooking oven. A cross section of this catalytic surface is shown as FIGURE 4 of the drawings.

Instead of the nickel nitrate, a solution comprising 5% cobalt acetate and 5% cerium nitrate is used and is calcined for converting to a useful oven panel.

Instead of the cobalt acetate, there is used a like quantity of copper formate, or iron succinate, or nickel nitrate, or tin chloride, or ammonium metavanadate, bismuth nitrate, or ammonium molybdate, or a finely pulverized slurry of ammonium tungstate.

Example 11

(1) An acid-resistant enamel softening in the 1500° F. range is coated onto a sheet of black iron, 20" x 20" x 1/16", and is fired according to prior art in the enamel coating industry.

(2) The enamel is coated with printing ink, and the tacky printing ink film is dusted with cerium oxide which passes 325 mesh screen, and the excess cerium oxide powder is removed from the surface.

(3) The panel is fired at 1500° F. for 3 minutes, then cooled.

(4) The adhering cerium oxide is impregnated with a solution containing 5% nickel nitrate and 5% manganese nitrate.

(5) The panel is then calcined at 400° C. for 5 minutes. The panel so produced is useful as an inside surface of domestic, self-cleaning cooking ovens.

In another test, the panel is further treated by impregnating with a 0.1% solution of platinum chloride and rhodium chloride in equal weight percentages. This is calcined at 400° C. for 3 minutes, then is immersed in a 30% formaldehyde solution and is dried at 150° C. to reduce the precious metals.

Instead of the nickel and manganese nitrates in paragraph (4), there is used a similar weight percentage of copper nitrate, tin chloride, ammonium metavanadate, sodium columbate (niobate), bismuth nitrate, chromium nitrate, manganese nitrate, sodium perrhenate, or iron nitrate.

There can instead be used a solution having a ratio of 5 parts manganese nitrate to 1 part chromium nitrate to total 10% salts in solution.

In the preceding paragraph, iron nitrate can be substituted for the chromium to produce an iron manganate having good catalytic properties.

Example 12

The procedure of Example 11 is followed except that instead of using cerium oxide to adhere to the semifused enamel, microspheroidal alumina is used. Microspheroidal alumina is a well-known article of commerce.

Example 13

The procedure is similar to Example 11 except that microspheroidal silica-alumina containing 12% alumina and 88% silica is used instead of the cerium oxide. Silica-aluminas of this type are well-known articles of commerce.

Example 14

This procedure is similar to Example 11 except that instead of the ceria of Example 11, there is used microspheroidal silica having a surface area of 400 m.$^2$/gm. and having an average spheroidal diameter of 0.4$\mu$.

Example 15

The panel described in Example 11 is treated similarly except that eta-alumina in a mesh size passing 325 mesh is used.

Example 16

The procedure is the same as Example 11 except that the support material is cerium oxide, 325 mesh, which has previously been coated with nickel oxide by impregnating the cerium oxide with a 10% solution of nickel nitrate and calcining and using the resultant dry powder to coat and to be partially fused into the enamel. As a substitute for the cerium oxide-nickel oxide to be fused onto the enamel, one can use cerium oxide impregnated with manganese oxide or copper oxide, tin oxide, vanadium pentoxide, niobium oxide, bismuth oxide, chromium oxide, molybdenum oxide, tungsten oxide, rhenium oxide, iron or cobalt oxides or their mixtures, or ruthenium, rhodium, palladium or platinum metals.

Example 17

This example encompasses the same operations as are performed in Example 11 or alternates thereto with the exception that the support material which is caused to firmly adhere and be partially cemented to the enamel is mixed rare earth oxides instead of the purer cerium oxide.

Example 18

The steps are the same as those employed in Example 11 and the alternates thereto except for the substitution of 100 to 325 mesh silica gel for the cerium oxide specified in Example 11.

Instead of the silica as 100 to 325 mesh as specified above, there can be used in the same mesh size range zirconia or titania, or barium oxide, or chromium oxide, manganese oxide, or chromites of manganese, iron, nickel or copper, or manganites, or manganates of copper, iron, nickel, cobalt or zinc. These are preferably used in a form in which the surface area is greater than 25 m.$^2$/gm. and in the size range of 200 mesh or finer, but this does not preclude the use of a material having lower surface area or being coarser if the requirements in the oven application are such as to make the coarser material preferable. The coarser material would be preferable in those cases in which the soil or combustible material encountered in the ovens is of a viscous or retentive nature, and may completely cover a catalytic layer which did not protrude above the surface unless relatively large catalytic granules are used.

I claim:

1. A cooking device having means for heating a cooking area, means for supporting food to be cooked, and walls at least partially enclosing said cooking area, the surfaces of said heating means, said supporting means, and said walls which are exposed to products resulting from heating food, being coated with a ceramic in which there is partially embedded a catalyst selected from the group consisting of ruthenium, palladium, platinum, or oxides, cerates, manganates, manganites, chromates, chromites, or vanadates of cobalt, nickel, cerium, ruthenium, palladium and platinum.

2. In a cooking device having means for heating a cooking area, means for supporting food to be cooked, and walls at least partially enclosing said cooking area, the surfaces of said walls which are exposed to products resulting from heating food being coated with a catalyst carrier which supports an oxidizing catalyst.

3. In a cooking device having means for heating a cooking area, means for supporting food to be cooked, and walls at least partially enclosing said cooking area, the surfaces of said walls which are exposed to products resulting from heating food being coated with a ceramic in which there is bonded a catalytic carrier which supports an oxidizing catalyst.

4. A method for cleaning from the interior surfaces of a cooking device products resulting from heating food during normal cooking use of said device by providing an oxidizing catalyst upon such surfaces before such normal cooking use and then effecting cleaning by heating to a temperature of about 400 to 500° F. to effect catalytic oxidation of said products with air normally present in said device.

References Cited by the Examiner
UNITED STATES PATENTS

| | | | |
|---|---|---|---|
| 1,683,375 | 9/1928 | Wiederhold | 126—92 |
| 2,433,932 | 1/1948 | Stosick | 252—471 X |
| 2,537,433 | 1/1951 | Waring | 126—19 |
| 2,543,708 | 2/1951 | Rice et al. | 158—96 |
| 2,790,434 | 4/1957 | Francia | 126—41 |
| 3,121,158 | 2/1964 | Hurko | 126—273 |

FREDERICK L. MATTESON, JR., *Primary Examiner.*

JAMES W. WESTHAVER, *Examiner.*

E. G. FAVORS, *Assistant Examiner.*